A. PRIESTMAN.
APPARATUS FOR CONTROLLING THE FLOW OF LIQUIDS.
APPLICATION FILED DEC. 22, 1908.
922,629.
Patented May 25, 1909.
3 SHEETS—SHEET 1.
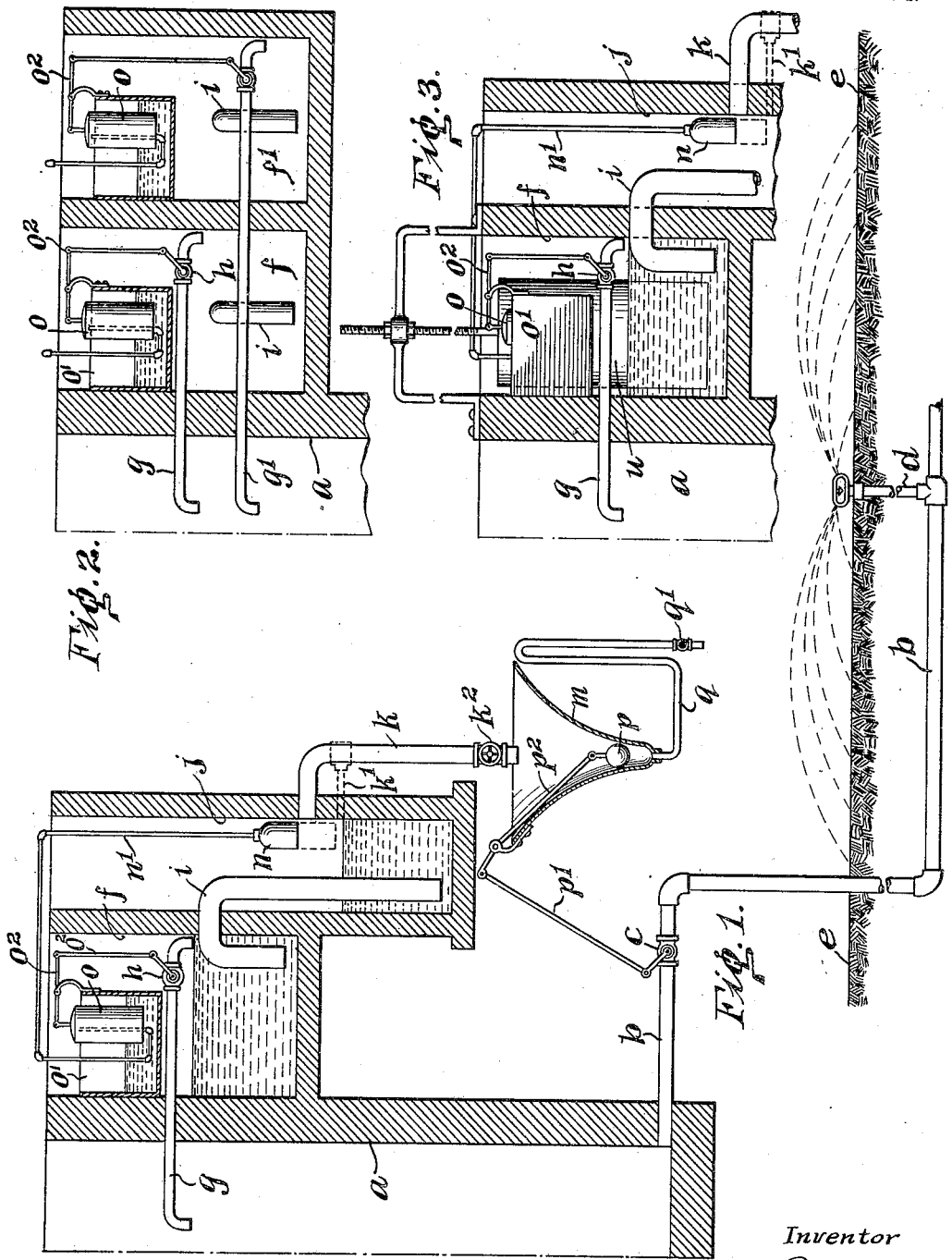
Witnesses
Daniel Webster, Jr.
A. M. Kelly.
Inventor
Albert Priestman
By
Attorney.

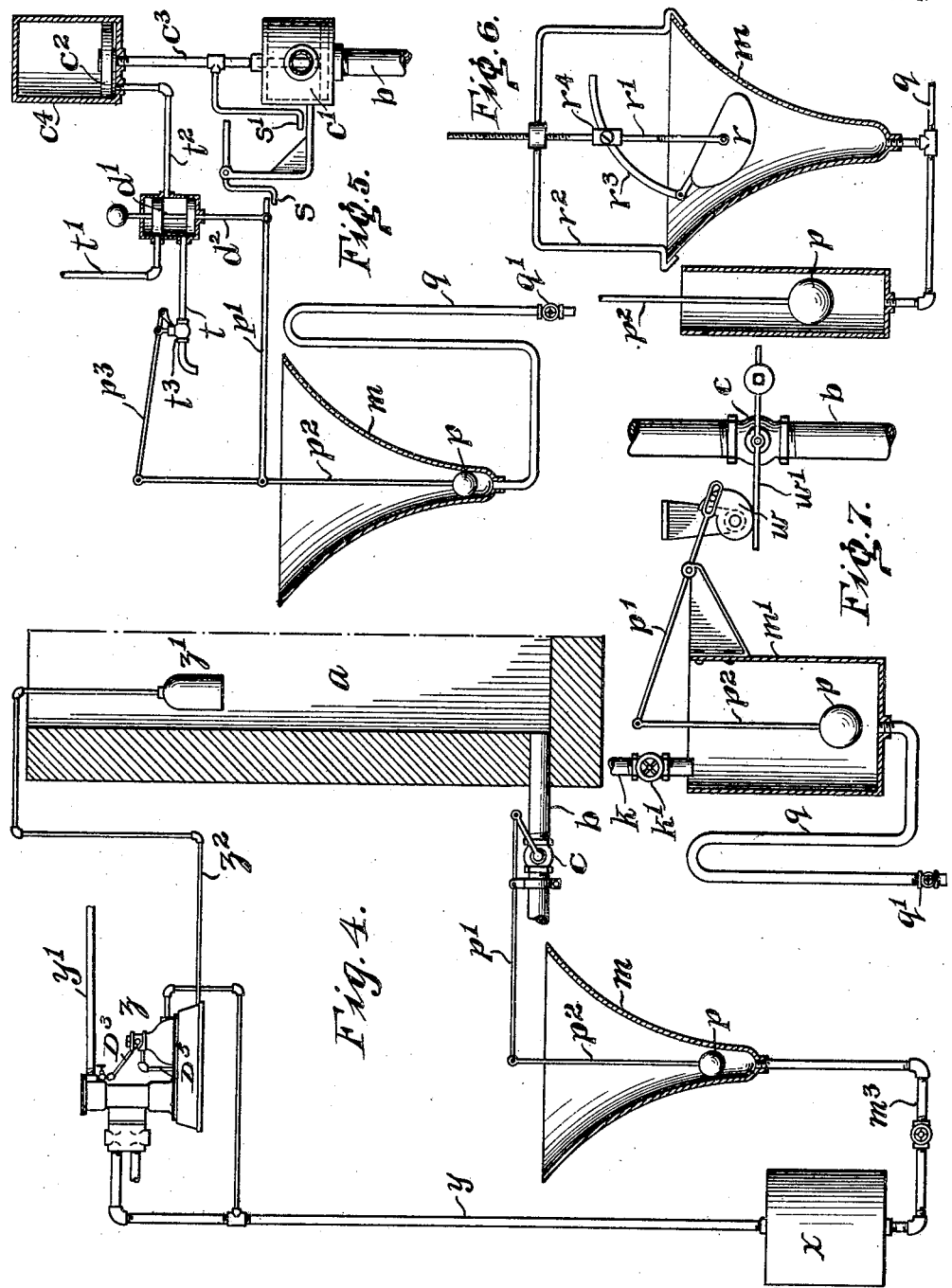

A. PRIESTMAN.
APPARATUS FOR CONTROLLING THE FLOW OF LIQUIDS.
APPLICATION FILED DEC. 22, 1908.
922,629.
Patented May 25, 1909.
3 SHEETS—SHEET 3.
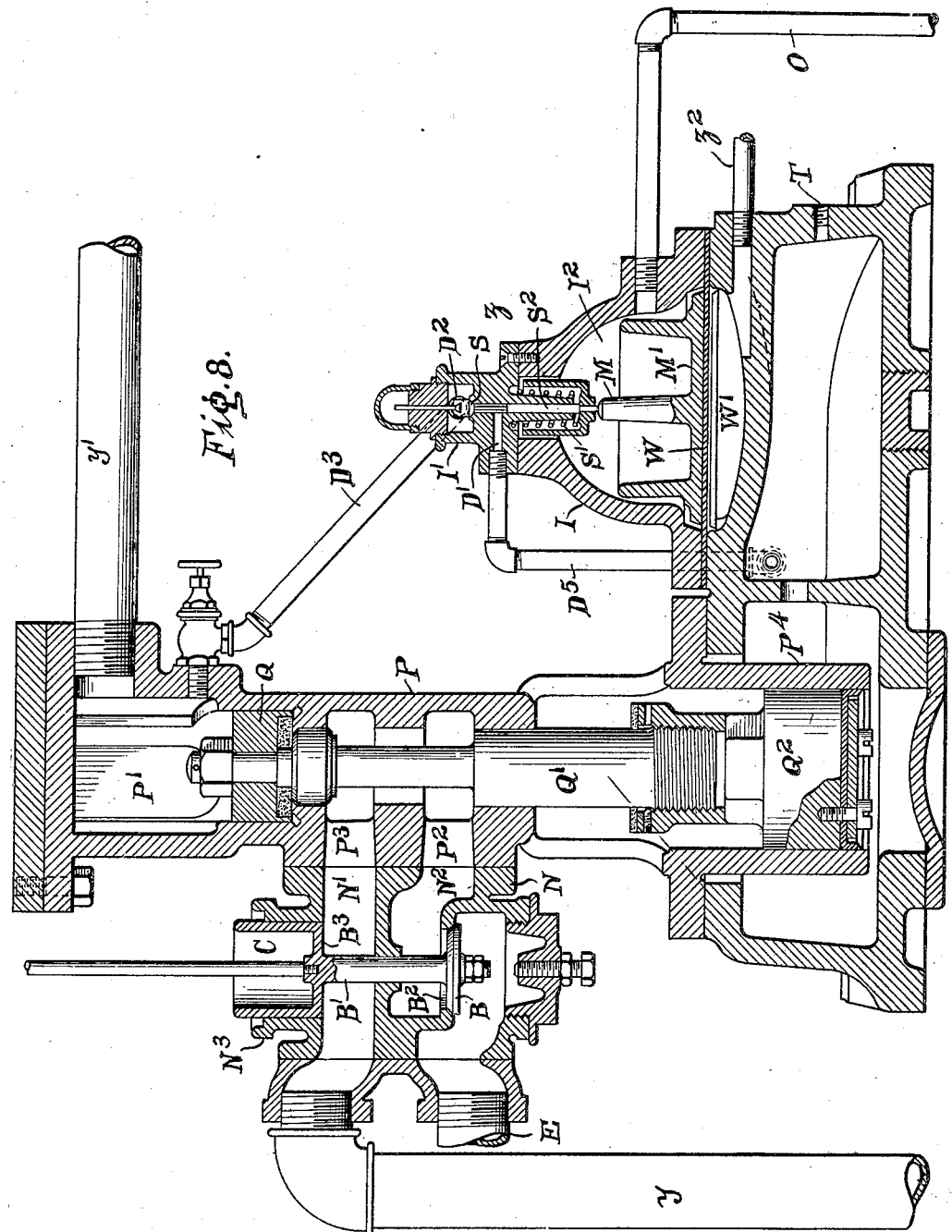

UNITED STATES PATENT OFFICE.

ALBERT PRIESTMAN, OF PHILADELPHIA, PENNSYLVANIA.

APPARATUS FOR CONTROLLING THE FLOW OF LIQUIDS.

No. 922,629.  Specification of Letters Patent.  Patented May 25, 1909.

Application filed December 22, 1908. Serial No. 468,884.

*To all whom it may concern:*

Be it known that I, ALBERT PRIESTMAN, subject of the King of England, and resident of the city and county of Philadelphia, State of Pennsylvania, have invented an Improvement in Apparatus for Controlling the Flow of Liquids, of which the following is a specification.

My improvements are particularly adapted for use in connection with sewage disposal systems for the purpose of controlling the distribution of the sewage by a sprinkler head or other distributing device over the surface of a filter bed.

When sewage is sprinkled upon beds of broken stone, or other material, the organic matter in suspension and solution will be oxidized through the agency of bacteria, provided the sewage passes down over the surfaces of the broken stone, or other material, in sufficiently thin films and in the presence of air. If, however, an excessive volume of sewage is sprinkled over any portion of the surface of the bed, proper oxidation will not take place in such portion, because the area sprinkled in proportion to the volume of water, is lessened and the increased volume acts to exclude the air from the bacteria as well as to impede the passage of air or other gaseous fluid through the interstices of the broken stone.

It has been found very difficult to produce such an even distribution of sewage divided into sufficiently fine streams, as will spread the sewage evenly over the surfaces of the broken stone. This is particularly difficult because it is advisable to use comparatively large orifices in the sprinklers or distributing devices to prevent clogging. The desired result can be obtained, only, when such provision is made, that the time, during which each portion of the area is being wet, shall be such as to cause equal amounts of sewage to fall on each portion of the bed in volumes which are not excessive.

The method usually employed is that of delivering, through stationary nozzles, intermittent doses of sewage of fixed volumes measured by the capacity of the tank in which each dose is collected.

To secure the necessary regulation of the rate of flow through the sprinkler heads the dosing tank must be of such formation as will produce a predetermined diminishing discharge during lessening periods of time, notwithstanding the fall of head in the dosing tank.

Not only is the conformity of the factors of volume, head, rate, and time difficult to secure, but it is desirable that the frequency and duration of discharge should be variable, so that a given volume of sewage may be supplied in smaller or larger quantities and at greater or less frequency, as may be most advantageous in relation to the depth and size of the filtering material, the climatic conditions, and the character of the sewage to be treated.

It is the primary object of my invention to secure this result of controlling the discharge of the sewage through a sprinkler head, or other distributing device, in such manner that the desired relationship of the factors of volume, head, rate, and time may be readily secured.

It is also an object of my invention to enable the frequency and volume of the sprinkled doses to be varied without disturbing the relationship of these factors.

The first object I accomplish by means of timing devices, controlled by the level of a measured dose of liquid, to impart a variable speed in the opening and closing of the valve or device which controls the flow of the sewage to the sprinkler head. As the spread of the sewage is dependent upon the extent of opening of the valve, it follows that by changing the speed of movement as the valve is opened or closed, the time, or period of sprinkling, may be varied in relation to the spread, and timed proportionally to produce an even and uniform distribution of sewage over the entire area supplied by any sprinkler head.

The preferred timing devices which I employ for this purpose consist of float controlled means operated by the level of the liquid in a tank of variable capacity at different levels, in which the speed at which the level of the liquid rises or falls varies directly with the required variations in the timing of the flow at the different radii of the spread. The timing may, however, be accomplished by other means than the timing tank of variable capacity, as by a cam actuated by the liquid level in a tank of uniform capacity. The liquid which controls these timing devices by its level is a measured dose, and a part of my improvements relates particularly to the means for measuring this dose and supplying it to the timing devices.

The frequency and volume of the sprinkled doses supplied by the sprinkler head may be varied, without disturbing the timing devices and the relationship of the factors upon which they depend, by varying the size or volume of the measured dose, by which those devices are controlled, or the rate of flow; and a part of my improvements relates to means for this purpose, and embraces means to vary the cubical contents of the dose-measuring tank, and also means to control the flow of the measured dose to the timing tank and its discharge therefrom. In some cases, also, it is desirable to vary the action of the timing devices to change the time of action, and my invention embraces means for this purpose also.

Among the results attained by my invention are the following: The delivery of sewage will be in accordance with the volume to be handled, while the frequency of the intermittent doses will be variable at will; the factors of volume, head, rate, and time may be adjusted without changes in the masonry of the tanks or filter beds; the more even distribution of sewage on the beds will enable larger volumes to be treated in a filter bed of given area, or an equal volume in a bed of less depth, thus reducing the size and cost of purification works; the frequency and volume of the sprinkled doses may readily be varied in relation to the character and size of the material of the bed, the climatic conditions, and the character of the sewage, thus reducing the liabilty of error in operation; the number of moving parts is reduced to a minimum; errors of miscalculation of friction through pipes and orifices may be readily corrected by hand manipulation; the rate of intermittent discharges through the sprinkler heads may be controlled irrespective of the head of sewage, so that flow equalizing tanks may be employed when desirable without affecting injuriously the distribution of sewage; two or more sets of apparatus may be connected with one tank, so that one filter will come into operation when the maximum rate of flow to another filter is exceeded.

While my invention is particularly adapted for controlling the flow of sewage to filtering beds, and is shown and described as applied to that use, it is not so limited, but may be used for controlling the flow of fluids, whether liquid or gaseous, for any purpose.

In the drawings, Figure 1 is a sectional elevation of an apparatus for automatically controlling the flow of fluids embodying the invention in one form as applied to a sewage-filtering bed; Fig. 2 is a similar view of part of an apparatus showing two dose-measuring tanks applied to a single reservoir; Fig. 3 is a similar view of part of an apparatus like that shown in Fig. 1 illustrating means for regulating the capacity of the dose-measuring tank; Fig. 4 is a sectional elevation of a modified form of apparatus employing pneumatic dose-measuring devices; Fig. 5 is a sectional elevation of part of the apparatus illustrating the use of a pilot-valve to control the main feed-valve; Fig. 6 is a sectional view illustrating a modified form of the timing tank and devices for regulating the timing action of the same; Fig. 7 is a similar view illustrating a modification of the tank and devices for timing the feed-valve and Fig. 8 is a vertical sectional view on an enlarged scale of the pneumatic devices shown in Fig. 4.

The automatic controlling devices for regulating the flow of the fluid to the sprinkler heads, or other distributing devices, is controlled by the liquid in the dosing tank $a$. The sewage or fluid controlled may be supplied directly from this tank, or from a different source, through a main feed-pipe $b$. $c$ is the controlling valve, which controls the flow of the fluid through the feed-pipe; and $d$ is a sprinkler head, or other device, by which the fluid is suppled to the bed $e$.

In the apparatus shown in Figs. 1, 2 and 3 the controlling valve $c$ is controlled primarily by a measured dose of liquid supplied from the dosing-tank $a$ through a feed-pipe $g$ to a dose-measuring tank $f$. The feed-pipe $g$ is controlled by a valve $h$, and when this valve is open, and there is a proper head in the tank $a$, the liquid will flow through the pipe $g$ into the dose-measuring tank $f$.

Suitable means are employed for discharging the measured dose from the tank $a$. As shown these consist of a siphon $i$ leading from the dose-measuring tank $f$ to a chamber $j$ which has a discharge-pipe $k$ leading to a timing tank $m$. The siphon $i$ is so arranged that when a given head is attained in the measuring tank $f$ it will siphon out the contents of the tank $f$ into the chamber $j$; and the discharge pipe $k$ is so arranged that it will discharge this volume of liquid into the timing tank $m$. Thus the exact volume, or dose of liquid, supplied to the dose-measuring tank $f$ will be supplied to the timing tank $m$ after passing through the siphon-chamber $j$. To insure this result it is desirable that the supply of liquid from the dosing tank $a$ to the measuring tank $f$ should be cut off when the desired head or dose is attained in the tank $f$. For this purpose I employ means controlled by the dose of liquid discharged from the dose-measuring tank to control the supply to such tank. As shown, these means consist of an air-bell $n$ located in the siphon-chamber $j$ substantially level with the inlet of the pipe $k$, a float $o$ for controlling the valve $h$, and an air-pipe $n'$ from the bell $n$ to the float $o$. The float $o$ is partly submerged in a float-chamber $o'$ in the tank $f$, and is connected by suitable power transmitting connection $o^2$ with the valve $h$.

Normally the siphon-chamber $j$ will be filled with liquid up to the inlet of the pipe $k$, the mouth of the bell $n$ will be free and the valve $h$ open. As soon, however, as the liquid begins to flow through the siphon $i$, the level will rise in the chamber $j$—the discharge-pipe $k$ being of smaller diameter than the siphon $i$—and the rising liquid will force air through the pipe $n'$ into the float $o$ and close the valve $h$. The valve $h$ will remain closed during the time that the measured dose of liquid drawn off by the siphon $i$ is passing through the chamber $j$, but as soon as that dose is discharged by the pipe $k$, the level in the chamber $j$ will again fall below the mouth of the bell $n$. This will relieve the air in the air-pipe $n$ and float $o$, and permit the valve $h$ to open, when the liquid will flow again from the tank $a$ into the dose-measuring tank $f$. To make this control of the valve $h$ more certain, I prefer to employ a small auxiliary discharge pipe $k'$ opening below the main inlet to the discharge $k$, and to arrange the mouth of the bell $n$ at the level of this smaller pipe (see dotted lines in Fig. 1). While the greater part of the volume of liquid composing the measured dose passes off rapidly through the larger inlet to the pipe $k$, this smaller pipe $k'$ controls the level which controls the valve $h$ and causes the last part of the dose to flow out more slowly.

The measured dose discharged by the pipe $k$ flows into the timing tank $m$. In the preferred form this tank $m$ is so proportioned that the level of the liquid supplied to it will rise at a decreasing speed. As shown the tank is funnel-shaped with curved surfaces, the curvature being such that the variations in the speed with which the level will rise and fall are proportional to the desired variations in the time of sprinkling action.

The valve $c$ in the main feed-pipe $b$ is controlled by the rising level of the liquid in the timing tank $m$ by means of suitable means, such as a float $p$ and connecting mechanism $p'$ $p^2$. When the tank $m$ is empty and the float $p$ is in its lowest position, as shown in Fig. 1, the valve $c$ is closed and the supply to the sprinkler head $d$ is shut off. As the spread of the liquid, or the area over which it is cast, is increased, less quantity of liquid will be supplied to any given area in a given period of time, than will be supplied at less spread to an equal area in the same period of time. From this it would result, if the action of the valve $c$ were not properly timed, that the liquid would be supplied to the bed in gradually decreasing quantities in proportion to the radii of the spread. It is to prevent this, and to obtain a substantially uniform distribution of the liquid over the entire area reached by the sprinkler head, that the timing tank $m$ is employed.

As the liquid supplied by the pipe $k$ rises in the tank $m$ it will lift the float $p$ and open the valve $c$ to a proportional extent, but, as the speed of the rise of the liquid in the tank $m$ gradually decreases, the speed of the movement of the float $o$ and valve $c$ will proportionally decrease, and as the spread of the liquid is proportional to the opening of the valve $c$, it follows that the time during which the liquid is supplied will vary in relation to the increase in the spread; and by properly proportioning the timing-tank $m$ the operation of the valve $c$ may be regulated to supply the liquid in substantially equal quantities over the entire area of the surface reached by the sprinkler-head. The liquid is discharged from the timing tank through pipe $q$ and the rate of discharge may be controlled by a valve $q'$. As the level of the liquid falls in the tank $m$ the operations described are reversed; the float $p$ falls and the valve $c$ closes at increasing speed, thus decreasing the time of action of the sprinkler head as the spread decreases.

The rate of the flow from the siphon-chamber to the timing tank $m$ may be regulated by a valve $k^2$ in the discharge pipe $k$. By this means the amount of sewage feed may be increased or diminished and the period of intermittency changed accordingly.

It will be noted that the timing of the valve $c$ is controlled by the measured dose admitted to the dose-measuring tank $f$; consequently the operation may be varied by varying the dose. To accomplish this without changing the tank itself, or any other parts of the apparatus, I employ a plunger $u$ (see Fig. 3) which may be raised or lowered in the tank $f$ to regulate its cubical capacity.

The liquid will be admitted to the dosing tank only when the level in the reservoir $a$ is above the supply pipe $g$; in some cases, however, it is desirable to operate two or more dose-measuring tanks and valve controlling devices at different levels from the same reservoir. Such a construction is shown in Fig. 2, where a second dose-measuring tank $f'$ is connected by a supply pipe $g'$ with the reservoir $a$ at a lower level.

It is desirable in some cases that the timing action of the tank $m$ should be varied. For this purpose I employ displacing blocks, such as $r$ (Fig. 6), which may be introduced in the tank $m$. As such block will cause the level of the liquid to rise faster at the place where it is located, it is apparent that the speed of the rise and fall may be regulated by adjusting the position of the block. For this purpose I have shown it carried by a threaded rod $r'$ which may be adjusted vertically in a yoke $r^2$ on the tank. Further adjustment is also provided by pivoting the block on the rod to enable its angular position to be changed. For securing the block in angular position I have shown it provided with a pivoted segmental arm $r^3$ passing through a sleeve $r^4$ on the rod $r'$. In this case, instead of placing the float $p$ directly in the tank $m$, it is arranged in a vessel $m'$ communicating at its bottom with the bottom of the tank $m$ by a pipe $m^2$. The speed of the rise and fall of the liquid in the vessel $m'$ will obviously be the same as that in the tank $m$.

In some cases it is desirable, that, instead of controlling the main feed-valve $c$ directly by the float in the timing tank, it should be controlled by a pilot-valve. Such an arrangement is shown in Fig. 5. $c'$ is a main gate-valve which controls the feed-pipe $b$. $c^2$ is a piston carried by the stem $c^3$ of the valve $c'$. $d'$ is a pilot-valve which controls the admission and relief of pressure to the piston chamber $c^4$ below the piston $c^2$. The stem $d^2$ of this pilot-valve is connected with the lever $p'$ of the float $p$, one end of which is connected with the float rod $p^2$ and the other end rests on a movable fulcrum $s$, which is controlled by a trip $s'$ on the stem $c^3$ of the main-valve $c'$.

When the float $p$ rises the lever $p'$ is rocked on the fulcrum $s$, and this operates the pilot-valve $d'$ to close the exhaust $t$ and open the pressure pipe $t'$ to the supply pipe $t^2$ to the motor. The speed of these movements will be proportional to the rise of the level of the liquid in the timing tank $m$. When the valve $c'$ is fully opened the trip $s'$ will strike the movable fulcrum $s$ and release the lever $p'$, permitting the pilot-valve $d'$ to close by gravity, thus shutting off the pressure to the piston $c^2$ and opening the exhaust $t$. The relief of the pressure on the piston $c^2$ through the exhaust $t$ is controlled, however, by a valve $t^3$ which is connected with the float by the connections $p^2$ $p^3$, so that the return of the pilot-valve and the closing of the main valve $c'$ are controlled by the float, and their movements are increased in proportion to the increased speed in the fall of the liquid level.

Instead of using a specially shaped timing tank $m$ similar results may be obtained with an ordinary tank and a float controlled cam for imparting the variable movements to the valve. Such a construction is shown in Fig. 7. The tank $m'$ is of uniform diameter so that there will be no variation in the speed of the rising and falling levels of the liquid, but the float $p$ is connected by the connecting mechanism $p'$ $p^2$ with a cam $w$ which acts on an arm $w'$ of the valve $c$. While the movements imparted to the cam $w$ by the float $p$ are of uniform speed, the variations in the operation of the valve $c$ are produced by the action of the cam face, and with a properly shaped cam the desired speed variations in the opening and closing of the valve $c$ may be obtained.

In the form of the apparatus shown in Figs. 1, 2 and 3 the operation of the valve, whether the main valve $c$ or a pilot valve, is controlled by a measured dose of liquid taken from the reservoir $a$, similar results may, however, be obtained with pneumatic devices controlled by the level of the liquid, either in the tank $a$ or in another tank, to force a measured quantity of liquid from a reservoir or storage-tank into the timing tank. Such an arrangement is shown in Fig. 4. $x$ is a reservoir or liquid storage tank connected with the measuring tank $m$ by a suitable pipe $m^3$, and also connected by the force pipe $y$ with the pneumatic controlling device $z$ which is controlled by an air bell $z'$ in the reservoir $a$. The details of the construction and operation of such a pneumatic controlling device $z$, as that illustrated, are as follows:—

P is a valve cylinder having an inlet $P'$ at the top communicating with the pressure pipe $y'$ and outlet port $P^2$ to the vent pipe E and a port $P^3$ to the fluid pressure pipe $y$. In the upper part of the cylinder P is a piston valve Q which controls communication between the port $P^3$ and the inlet chamber $P'$, and below this carried by the piston rod or stem is a valve $Q'$ which controls communication between the ports $P^2$ and $P^3$.

$P^4$ is a cylinder below the cylinder P, in which is a motor or piston $Q^2$ connected by a suitable coupling with the valve mechanism Q Q'.

$D^5$ is a pressure pipe for admitting pressure below the piston $Q^2$. The admission of pressure through this pipe $D^5$ is controlled by a valve S arranged in a body $I'$ having an outlet $D'$ leading to the pipe $D^5$ and an inlet $D^2$ communicating with a branch $D^3$ from the pressure chamber $P'$. When the valve S is opened the air pressure from the branch $D^3$ will act on the piston $Q^2$; the same pressure per square inch will then be acting oppositely on the pistons Q and $Q^2$, and by reason of the greater area of the latter, the pistons will move upward and the vent port $P^2$ will be closed by the valve $Q'$, while the valve Q will open communication between the port $P^3$ and the inlet chamber $P'$, and the air pressure will be admitted to the pipe $y$ and thence to the tank $x$ to force its contents into the timing tank $m$.

T is a vent, which may be regulated by a suitable valve to control the escape from below the piston $Q^2$ and the time in which the valves Q, $Q'$ will be operated.

The valve S is controlled automatically by the liquid level in the dosing tank $a$ by means of the bell $z'$ and pipe $z^2$ which leads to the motor chamber $W'$ below the motor W.

Above the motor is a hollow dome I in the top of which is located the valve body $I'$ of the valve S. The valve S controls the thoroughfare between the inlet $D^2$ and the outlet $D'$ and its stem S², which extends down through a tubular extension in the body I', makes contact with a pin M on a plate M' on the upper face of the motor W.

S' is a spring between the valve stem S² and the valve body acting to hold the valve normally closed. When the level of the liquid rises in the tank a and forces air through the bell z' and pipe z² into the motor chamber W', the motor W will be lifted and the pin M acting on the valve stem S² will lift the valve S and open communication between the pipes D³ and D⁵.

O is a pipe leading from the pipe y to the chamber I² in the dome I above the motor W. As soon as the valves Q and Q' have been operated by the opening of the valve S and air pressure is admitted to the pipe y, this air pressure will act through the pipe O on the upper side of the motor and will force it back, thus enabling the spring S' to close the valve S.

The operation of the valve S is almost instantaneous, and the movement of the valves Q Q' inclosing the inlet P' and opening the vent port P² is controlled entirely by the relief of the pressure on the piston Q² through the vent T.

The relief pipe E is controlled by a valve B located in a valve box N having passageways N' N² communicating respectively between the port P³ and force pipe y and between the exhaust port P² and the vent pipe or inlet E. The valve B opens outwardly and controls a thoroughfare B² in the passageway N². The valve stem B' extends through the passageway N' and carries a piston B³ moving freely in an open cylinder N³ in the valve box and subjected to the pressure in the passageway N'. The diameter of the piston B³ is slightly greater than that of the valve B. The valve and piston are loose and normally will occupy a lowered position by gravity.

The details of these pneumatic controlling devices form no part of the present invention, as they are partly the subject matter of the Moore application Ser. No. 368,560, filed April 16, 1907, and partly of the Priestman and Moore application Ser. No. 441,960, filed July 6, 1908.

What I claim is as follows:

1. In apparatus for controlling the flow of liquids, the combination of a dose-measuring tank, a chamber to receive liquid, means for automatically discharging the contents of the dose-measuring tank into said chamber when a given dose is attained, a discharge outlet from said chamber arranged to discharge the measured dose therefrom, and means automatically controlled by liquid of the measured dose, passing through said chamber, to control the supply to the dose-measuring tank, a liquid distributing device, means to control the flow of liquid to said distributing device, and means for controlling said means to control the flow of liquid to said distributing device, controlled by the liquid of the measured dose discharged from said chamber.

2. In apparatus for controlling the flow of liquids, the combination of a dose-measuring tank, a chamber to receive liquid, means for automatically discharging the contents of the dose-measuring tank into said chamber when a given dose is attained, a discharge outlet from said chamber arranged to discharge the measured dose therefrom, and means automatically controlled by liquid of the measured dose passing through said chamber to control the supply to the dose-measuring tank, a liquid distributing device, means to control the flow of liquid to said distributing device, a tank arranged to receive the measured dose discharged from said chamber, and means controlled by the liquid level in said tank to control said means to control the flow of liquid to said distributing device.

3. In apparatus for controlling the flow of liquids, the combination of a dose-measuring tank, a chamber to receive liquid, means for automatically discharging the contents of the dose-measuring tank into said chamber when a given dose is attained, a discharge outlet from said chamber arranged to discharge the measured dose therefrom, and means automatically controlled by liquid of the measured dose passing through said chamber to control the supply to the dose-measuring tank, a liquid distributing device, means to control the flow of liquid to said distributing device, and timing devices controlled by the liquid of the measured dose to control said means to control the flow of liquid to said distributing device, with a variable movement.

4. In apparatus for controlling the flow of liquids, the combination of a dose-measuring tank, a chamber to receive liquid, means for automatically discharging the contents of the dose measuring tank into said chamber when a given dose is attained, a discharge outlet from said chamber arranged to discharge the measured dose therefrom, and means automatically controlled by liquid of the measured dose passing through said chamber to control the supply to the dose measuring tank, a liquid distributing device, means to control the flow of liquid to said distributing device, a tank arranged to receive the measured dose discharged from said chamber, and means controlled by the liquid level in said tank to control said means to control the flow of liquid to said distributing device, said tank having a varying diameter to impart varying speed in the rise and fall of its liquid level.

5. In apparatus for controlling the flow of liquids, the combination of a dose-measuring tank, a chamber to receive liquid, means for automatically discharging the contents of the dose-measuring tank into said chamber when a given dose is attained, a discharge outlet from said chamber arranged to discharge the measured dose therefrom, and means automatically controlled by liquid of the measured dose passing through said chamber to control the supply to the dose-measuring tank, a liquid distributing device, means to control the flow of liquid to said distributing device, a tank arranged to receive the measured dose discharged from said chamber, and means controlled by the liquid level in said tank to control said means to control the flow of liquid to said distributing device, and means to control the discharge of the liquid from said tank.

6. In apparatus for controlling the flow of liquid, the combination of a liquid distributing device, means to control the flow of liquid to said distributing device, timing devices for controlling the speed of the movement of said means to control the flow of liquid to said distributing device, controlled by the level of a measured dose of liquid, and means for supplying said measured dose to said timing devices.

7. In apparatus for controlling the flow of liquids, the combination of a liquid distributing device, means to control the flow of liquid to said distributing device, a timing tank, means controlled by the level of the liquid in said tank to control said means for controlling the flow of liquid to said distributing device, and means for supplying a measured dose of liquid to said timing tank.

8. In apparatus for controlling the flow of liquids, the combination of a liquid distributing device, means to control the flow of liquid to said distributing device, a timing tank, means controlled by the level of the liquid in said tank to control said means for controlling the flow of liquid to said distributing device, and means for supplying a measured dose of liquid to said timing tank, said tank having a varying capacity at different levels to impart varying speed in the rise and fall of its liquid level.

9. In apparatus for controlling the flow of liquids, the combination of a liquid distributing device, a valve to control the flow of liquid to said distributing device, a timing tank having a varying capacity at different levels to impart a varying speed in the rise and fall of its liquid level, and means for controlling said valve controlled by the level of the liquid in said timing tank.

10. In apparatus for controlling the flow of liquids, the combination of a liquid distributing device, a valve to control the flow of liquid to said distributing device, a timing tank having a varying capacity at different levels to impart a varying speed in the rise and fall of its liquid level, means to control the discharge of liquid from said tank, and means for controlling said valve controlled by the level of the liquid in said timing tank.

11. In apparatus for controlling the flow of liquids, the combination of a liquid distributing device, a timing tank having a varying capacity at different levels to impart a varying speed in the rise and fall of its liquid level, adjustable devices to vary the cubical contents of said tank and thereby to adjust the speed in the rise and fall of the liquid level in said tank, and means for controlling said valve controlled by the level of the liquid in said timing tank.

12. In apparatus for controlling the flow of liquids, the combination of a liquid distributing device, a valve to control the flow of liquid to said distributing device, a timing tank having a varying diameter to impart a varying speed in the rise and fall of its liquid level, an adjustable displacing block arranged in said tank and adapted by its adjustment to vary the cubical contents of the tank, and means for controlling said valve controlled by the level of the liquid in said timing tank.

13. In apparatus for controlling the flow of liquids, the combination of a liquid distributing device, a valve to control the flow of liquid to said distributing device, a timing tank having a varying diameter to impart a varying speed in the rise and fall of its liquid level, an adjustable displacing block arranged in said tank and adapted by its adjustment to vary the cubical contents of said tank, means to move said block vertically in said tank, and means for controlling said valve controlled by the level of the liquid in said timing tank.

14. In apparatus for controlling the flow of liquids, the combination of a liquid distributing device, a valve to control the flow of liquid to said distributing device, a timing tank adapted to contain liquid, means for controlling said valve controlled by the rise and fall of the level of the liquid in said tank, and an adjustable displacing block arranged in said tank and adapted to vary the cubical contents of the tank at different levels whereby a variable speed may be imparted to the rise and fall of the liquid level therein.

15. In apparatus for controlling the flow of liquids, the combination of a liquid distributing device, a valve to control the flow of liquid to said distributing device, a timing tank adapted to contain liquid, means for controlling said valve controlled by the rise and fall of the level of the liquid in said tank, and a pivoted and vertically movable adjustable displacing block arranged in said tank and adapted to vary the cubical contents of the tank at different levels whereby a variable speed may be imparted to the rise and fall of the liquid level therein.

16. In apparatus for controlling the flow of liquids, the combination of a liquid distributing device, a valve to control the flow of liquid to said distributing device, a timing tank adapted to contain liquid, means for controlling said valve controlled by the rise and fall of the level of the liquid in said tank, a displacing block arranged in said tank and adapted to vary the cubical contents at different levels, and means to adjust said block vertically.

17. In apparatus for controlling the flow of liquids, the combination of a liquid distributing device, a valve to control the flow of liquid to said distributing device, a timing tank adapted to contain liquid, means for controlling said valve controlled by the rise and fall of the level of the liquid in said tank, a displacing block arranged in said tank and adapted to vary its cubical contents at different levels, and means to adjust the angular position of said block.

18. In apparatus for controlling the flow of liquids, the combination of a dose-measuring tank, means for discharging the contents of the dose-measuring tank when a given dose is attained, means automatically controlled by the liquid of the measured dose discharged from said tank for controlling the supply to the dose-measuring tank, whereby the supply to the dose-measuring tank is automatically closed and is maintained closed until said measured dose is wholly discharged, and means to vary the cubical contents of the dose-measuring tank and the volume of the measured dose.

19. In apparatus for controlling the flow of liquids, the combination of a dose-measuring tank, means for discharging the contents of the dose-measuring tank when a given dose is attained, means automatically controlled by the liquid of the measured dose discharged from said tank for controlling the supply to the dose-measuring tank, whereby the supply to the dose measuring tank is automatically closed and is maintained closed until said measured dose is wholly discharged, and means to vary the cubical contents of the dose-measuring tank and the volume of the measured dose consisting of a plunger adapted to be raised and lowered in the tank.

20. In apparatus for controlling the flow of liquids, the combination of a dose-measuring tank, an inlet-pipe for supplying liquid to said tank, a valve in said pipe, means for automatically discharging the liquid from said tank when a measured dose is attained, and means automatically controlled by the liquid of the measured dose discharged from said tank for controlling said valve in the supply pipe.

21. In apparatus for controlling the flow of liquids, the combination of a dose-measuring tank, an inlet-pipe for supplying liquid to said tank, a valve in said pipe, a siphon for discharging the contents of the dose-measuring tank when a given dose is attained, a chamber to receive the liquid discharged by said siphon and having an outlet, to discharge the measured dose, an air-bell arranged to have its mouth submerged in the liquid of the measured dose passing through said chamber, and pneumatically controlled devices controlled by said air-bell for controlling said valve in the supply pipe to the dose-measuring tank.

22. In apparatus for controlling the flow of liquids, the combination of a dose-measuring tank, means for automatically discharging the contents of the dose-measuring tank when a given dose is attained, a chamber to receive the measured dose discharged from said tank, a main discharge outlet arranged to discharge the measured dose from said chamber, a smaller auxiliary outlet from said chamber below the main outlet, and means, automatically controlled by the liquid of the measured dose passing through said chamber, to control the supply to said tank, embracing an air-bell having its mouth arranged substantially at the level of the auxiliary outlet in said chamber.

In testimony of which invention, I hereunto set my hand.

ALBERT PRIESTMAN.

Witnesses:
R. M. KELLY,
E. G. FARLEY.